(12) United States Patent
Maria Vega et al.

(10) Patent No.: US 11,943,245 B2
(45) Date of Patent: Mar. 26, 2024

(54) SYSTEM, DEVICE, AND METHOD OF PROTECTING ELECTRONIC DEVICES AGAINST FRAUDULENT AND MALICIOUS ACTIVITIES

(71) Applicant: ALLOT LTD., Hod HaSharon (IL)

(72) Inventors: Jose Maria Vega, Toledo (ES); Julio Torres de la Fuente, Madrid (ES); Boris Lifshitz, Kokhav Yair (IL)

(73) Assignee: ALLOT LTD., Hod Hasharon (IL)

( * ) Notice: Subject to any disclaimer, the term of this patent is extended or adjusted under 35 U.S.C. 154(b) by 346 days.

(21) Appl. No.: 17/367,457

(22) Filed: Jul. 5, 2021

(65) Prior Publication Data
US 2023/0007024 A1   Jan. 5, 2023

(51) Int. Cl.
*H04L 9/40* (2022.01)

(52) U.S. Cl.
CPC ...... *H04L 63/1425* (2013.01); *H04L 63/1441* (2013.01)

(58) Field of Classification Search
CPC . H04L 63/20; H04L 63/1425; H04L 63/1433; H04L 41/147; H04L 41/14; H04L 63/1441
See application file for complete search history.

(56) References Cited

U.S. PATENT DOCUMENTS

| | | | |
|---|---|---|---|
| 9,686,173 B1 * | 6/2017 | Giordano | H04L 67/01 |
| 11,188,643 B2 * | 11/2021 | Chen | G06N 3/044 |
| 11,297,083 B1 * | 4/2022 | Kuppa | H04L 63/1458 |
| 2017/0124478 A1 * | 5/2017 | Baradaran | H04L 41/16 |
| 2018/0219881 A1 * | 8/2018 | Kayacik | G06F 21/552 |
| 2019/0114245 A1 * | 4/2019 | Mermoud | G06F 11/3466 |
| 2022/0239758 A1 * | 7/2022 | Klein | G06N 5/04 |

(Continued)

OTHER PUBLICATIONS

He et al., "Intelligent Detection for Key Performance Indicators in Industrial-Based Cyber-Physical Systems," IEEE Transactions on Industrial Informatics Year: 2021 | vol. 17, Issue: 8 | Journal Article | Publisher: IEEE.*

(Continued)

*Primary Examiner* — Roderick Tolentino
(74) *Attorney, Agent, or Firm* — AlphaPatent Associates Ltd.; Daniel J. Swirsky (57) ABSTRACT

Systems, devices, and methods of protecting electronic or Internet-connected devices against fraudulent and malicious activities. A Data Collector and Mediator Unit monitors network traffic, and generates datasets of network traffic; each dataset includes network traffic monitored within a time-slot having a particular fixed time-length. A Predictor Unit includes a Features Extractor, to extract features from the datasets; and a Machine Learning (ML) unit, to run the extracted features through a ML model and to classify a particular traffic-portion as being either (I) an anomalous traffic-portion that is associated with fraudulent or malicious activity, or (II) a non-anomalous traffic-portion that is not-associated with fraudulent or malicious activity. The ML unit operates on both (i) anomalies in traffic patterns, and (ii) anomalies of user behavior and/or device behavior. A fraud and malicious activity mitigation unit activates mitigation operations for traffic-portions that were classified anomalous traffic-portions associated with fraudulent or malicious activity.

17 Claims, 5 Drawing Sheets

(56) References Cited

U.S. PATENT DOCUMENTS

| | | | |
|---|---|---|---|
| 2022/0327108 A1* | 10/2022 | Manolache | G06N 3/084 |
| 2023/0007023 A1* | 1/2023 | Andrabi | H04L 63/1425 |
| 2023/0090743 A1* | 3/2023 | Pinto | G06V 10/454 |
| | | | 382/141 |

OTHER PUBLICATIONS

Meng et al., "Deep Learning Based Attribute Classification Insider Threat Detection for Data Security," 2018 IEEE Third International Conference on Data Science in Cyberspace (DSC) Year: 2018 | Conference Paper | Publisher: IEEE.*

\* cited by examiner

Fig. 5 ns SYSTEM, DEVICE, AND METHOD OF
PROTECTING ELECTRONIC DEVICES
AGAINST FRAUDULENT AND MALICIOUS
ACTIVITIES

FIELD

Some embodiments are related to the field of communication networks.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, Instant Messaging (IM), video conferences, playing games, or the like.

SUMMARY

Some embodiments provide systems, devices, and methods of protecting electronic and/or Internet-connected devices against fraudulent and malicious activities.

In some embodiments, a system comprises: (a) a Data Collector and Mediator Unit, to monitor network traffic, and to generate datasets of network traffic; wherein each dataset includes network traffic that was monitored within a time-slot having a particular fixed time-length; (b) a Predictor Unit, comprising: a Features Extractor unit, to extract a plurality of features from said datasets; a Machine Learning (ML) unit, to run said features through a ML model and to classify a particular traffic-portion as being either (I) an anomalous traffic-portion that is associated with fraudulent or malicious activity, or (II) a non-anomalous traffic-portion that is not-associated with fraudulent or malicious activity; wherein the ML unit operates on both (i) anomalies in traffic patterns, and (ii) anomalies of user behavior or device behavior; (c) a fraud and malicious activity mitigation unit, configured to trigger activation of one or more pre-defined mitigation operations with regard to traffic-portions that were classified by the ML unit as being an anomalous traffic-portions that are associated with fraudulent or malicious activity.

Some embodiments may provide other and/or additional advantages and/or benefits.

DETAILED DESCRIPTION OF SOME DEMONSTRATIVE EMBODIMENTS

Some embodiments include systems, devices, and methods of protecting electronic and/or Internet-connected devices against fraudulent and malicious activities.

The Applicants have realized that a large portion of electronic devices, end-user devices, Internet-connected devices and end-points are not protected, at all or properly, against malicious activity or attacks. Such devices are often exposed to malware, which in turn may cause identity theft, theft of personal data, unauthorized access to privileged information or to a privileged account, unauthorized use of the Internet-connected device itself, and/or other malicious or harmful activities that are not authorized by the owner or the legitimate operator of the Internet-connected device. The Applicants have also realized that the utilization of a conventional anti-virus or anti-malware software, still does not provide proper and complete protection to such Internet-connected devices.

In accordance with some embodiments, a novel protection system utilizes a combination of two methods or processes or components. Some embodiments may be used in conjunction with non-encrypted Internet traffic, or in conjunction with encrypted Internet traffic, or in conjunction with both encrypted and non-encrypted Internet traffic.

A first method or process or component performs anomaly detection, by detecting an abnormally sharp increase (or other irregular increase) in the number of requests per second that are outgoing from the Internet-connected device, and/or by detecting a large number of requests to access websites or domains or other online venues that are known to be associated with negative reputation or with questionable reputation or with suspicious activities (e.g., "phishing" websites, social engineering websites, malware-serving or malware-containing websites).

A second method or process or components performs analysis of the behavioral variation of the Internet-connected device; such as, detecting changes in (or a deviation from) the navigation patterns that the device typically exhibited, thereby indicating a fraudulent or malicious activity. For example, an Internet-connect smoke detector or refrigerator is typically configured to access the same online destination or website or server; and new attempt(s) by such device to access a new, different, website or domain or server, may indicate that the device was compromised or that a malicious actor has taken control over the device (e.g., via malware, via a man-in-the-middle attack, via theft or switching of a SIM card, or the like). In another example, a legitimate human user may spend approximately the same time visiting the same types of websites (e.g., spending 60% of the time in Social Networks; spending 30% of the time in consuming News; and spending 10% of the time in Online Shopping); some embodiments may detect a change, or a deviation from, such exhibited usage patterns, of that user and/or of other users of the same type, thereby indicating fraudulent or malicious or unauthorized activity.

Some embodiments may provide a Machine Learning (ML) based system, able to detect anomalies for a non-labeled multi-variate time series. Such system may include, for example, a data collector and mediator unit; a predictor unit; a re-training unit; and/or other suitable components as described herein.

Figure 1:
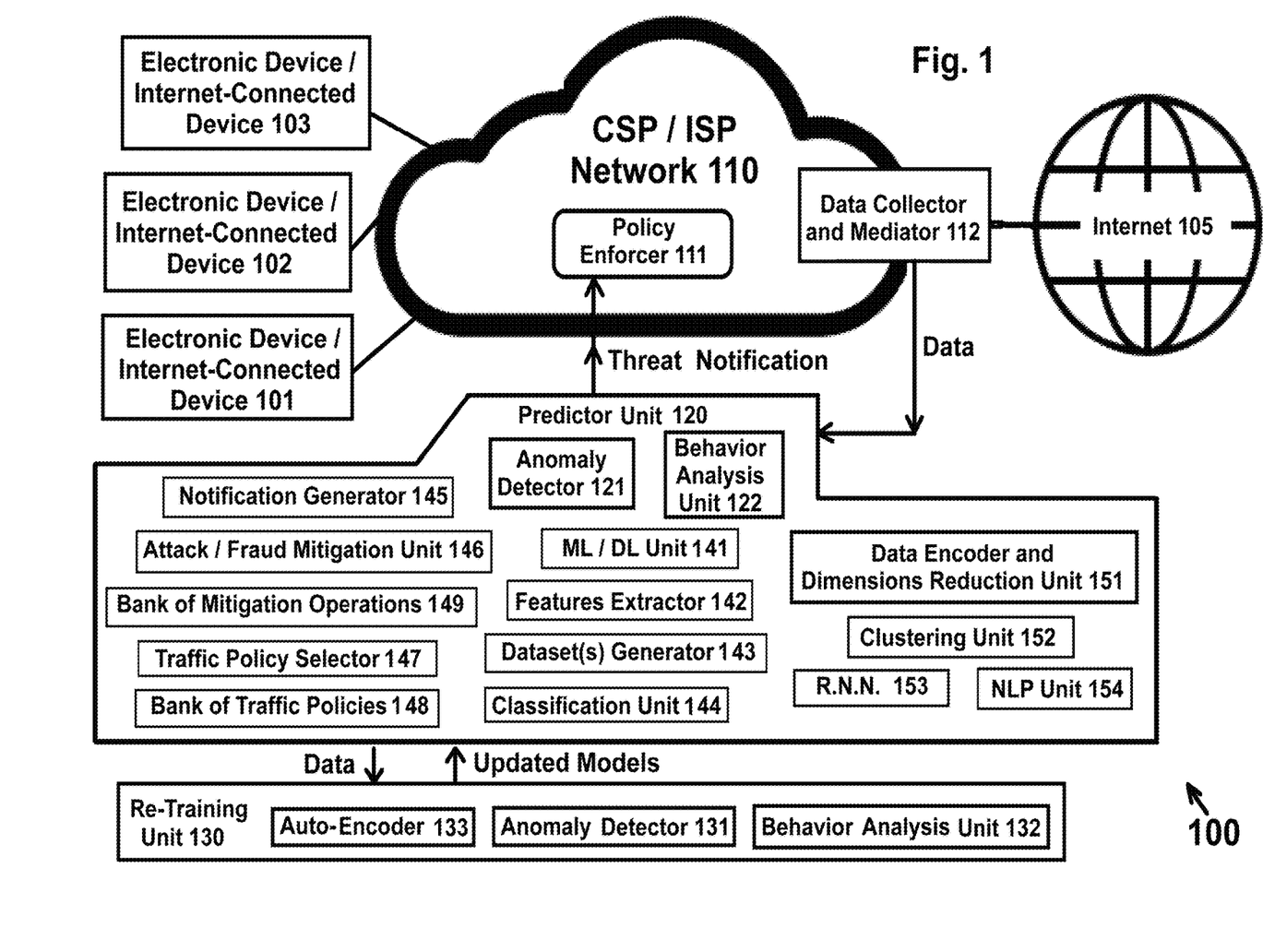
FIG. 1 is a schematic block diagram illustration of a system for protecting electronic and/or Internet-connected devices against fraudulent and malicious activities, in accordance with some demonstrative embodiments.

Reference is made to FIG. 1, which is a schematic block diagram illustration of a system 100 for protecting electronic and/or Internet-connected devices against fraudulent and malicious activities, in accordance with some demonstrative embodiments. One or more end-user devices or electronic devices or Internet-connected devices, such as devices 101 and 102 and 103, may be or may include, for example, a smartphone, a tablet, a laptop computer, a desktop computer, a smart-watch, a smart television, a gaming device, an Internet Protocol (IP) connected device, an Internet-of-Things (IoT) device, an Internet-connected home appliance, an Internet-connected camera or security camera, an Internet-connected sensor, an Internet-connected smoke detector, an Internet-connected vending machine, or other electronic device or Internet-connected device or device having capability to connect to the Internet 105.

For example, device 101 (e.g., a smartphone) may connect to the Internet via a Cellular Service Provider (CSP); whereas device 102 (e.g., a laptop computer) may connect to the Internet via an Internet Service Provider (ISP); whereas device 103 (e.g., a desktop computer) may connect to the Internet over a wired communication link. Accordingly, system 100 may include a CSP/ISP network 110, which includes one or more network elements, communication units, radios, switches, hubs, wired links, wireless links, and/or other elements that together provide the functionality of a CSP network and/or of an ISP network, and which provide Internet access or Internet connectivity to devices 101-103.

In some embodiments, a Data Collector and Mediator Unit 112 is connected within the CSP network, or within the ISP network, or at an exit node of the CSP network, or at an exit node of the ISP network, or at a communication segment that connects the CSP network to the Internet, or at a communication segment that connects the ISP network to the Internet, or at a communication segment that connects the CSP/ISP network to an entry node of the Internet. In some embodiments, Data Collector and Mediator Unit 112 is deployed as an in-line network element or an in-line network node, between the CSP/ISP network 110 and the Internet 105, or between the CSP/ISP network 110 and the public network. In other embodiments, Data Collector and Mediator Unit 112 is deployed in parallel to the communication segment that connects the CSP/ISP network 110 and the Internet 105, operating in tap mode or as a network tap element. In some embodiments, Data Collector and Mediator Unit 112 intercepts traffic, or monitors traffic, or listens to traffic, or collects traffic, or duplicates or replicates traffic for monitoring. The monitored traffic may include packets, data packets, outgoing traffic, incoming traffic, outbound traffic, inbound traffic, payload, headers, meta-data of packets (e.g., origin, destination, packet number, packet size, timestamp), TCP/IP traffic, HTTP traffic, HTTPS traffic, FTP traffic, and/or other types of traffic. In some embodiments, Data Collector and Mediator Unit 112 collects or gathers traffic (e.g., packets), and replicates them with their respective timestamps; and stores them towards further analysis by the Predictor Unit 120.

In some embodiments, Data Collector and Mediator Unit 112 collects and provides traffic to the Predictor Unit 120, or selectively generates and provides data records for selected monitored traffic; for example, traffic corresponding to (or associated with) a particular Internet-connected device, or traffic corresponding to (or associated with) a particular cellular subscriber or CSP subscriber or CSP customer, or traffic corresponding to (or associated with) a particular Internet subscriber or ISP subscriber or ISP customer, or traffic corresponding to (or associated with) a particular account or CSP account or ISP account, or traffic corresponding to (or associated with) a particular type of Internet-connected devices (e.g., traffic of smartphones; or, traffic of Android smartphones; or, traffic of Samsung Galaxy smartphones; or, traffic of Internet-connected smoke detectors; or the like), or traffic corresponding to a particular type of users or subscribers (e.g., traffic of Internet-connected devices of cellular service subscribers that are known to be males in the age of 21 to 35; or traffic of devices of Internet subscribers that are known to be subscribed to a particular guaranteed bandwidth level), or other types of traffic or categories of traffic. In some embodiments, the type of traffic to be monitored, may be pre-configured in the system; or may be dynamically re-configured or modified based on one or more rules or condition (for example, specifically monitoring traffic that is outgoing from smoke detectors, based on a discovery of a new exploit in smoke detectors).

The Predictor Unit 120 operates to detect fraudulent or malicious activities, and/or to estimate or to determine that a particular traffic portion (e.g., a particular payload, or a particular set of packets) is associated with fraud or with a malicious activity or with an unauthorized use, based on Machine Learning/Deep Learning (ML/DL) analysis of the collected traffic and its features. Based on such analysis, Predictor Unit 120 sends a notification or a triggering signal or other signal or message to a Policy Enforcer Unit 111, which may be located in the ISP/CSP network 111 or may be part of the ISP/CSP network 111 or may be operably associated with the ISP/CSP network 111 or may otherwise perform enforcement of a traffic-related policy with regard to traffic of ISP/CSP network 111 or with regard to traffic passing through ISP/CSP network 111 or with regard to traffic outgoing from ISP/CSP network 111 or with regard to traffic incoming to ISP/CSP network 111.

Policy Enforcer Unit 111 may include one or more suitable sub-units or components, for example, a firewall which may be dynamically configured or re-configured based on the analysis results, a switch, a hub, a router, a traffic discarding unit to discard packets or communication flows, a traffic blocking unit to block packets or communication flows, a traffic quarantine unit to temporarily quarantine packets or communication flows, a traffic transport delay unit to intentionally inject or add a time delay to the transport or to the passage or to the relay of particular packets or communication flows, a traffic shaping unit, a traffic limiting or constraining unit, a traffic bandwidth limiting unit or filter or filtering mechanism, a traffic steering unit, a traffic re-routing unit (e.g., to re-route certain packets or flows to alternate servers and/or through other communication routes or communication links), a traffic modification unit which may be capable of dropping and/or adding and/or replacing and/or re-writing packets or packet-portions (e.g., in order to selectively remove or discard or replace malicious components), a traffic-related billing unit or charging unit (e.g., configured to increase or to introduce a particular monetary charge to a particular Internet subscriber or Cellular subscriber due to detection of malicious activity), and/or other suitable traffic enforcement policies or operations.

In some embodiments, the above-mentioned traffic-related policies or traffic enforcement policies, may be stored in a Bank of Traffic Policies 148, for example, as sets of rules that pertain to each such policy and/or that describe or define each such policy; and a Traffic Policy Selector Unit 147 may select one or more of those traffic policies, that the Policy Enforcer Unit 111 then enforces towards the ISP/CSP network 110 and/or within the ISP/CSP network 110 and/or towards the traffic that pass through ISP/CSP network 110. In some embodiments, Bank of Traffic Policies 148 and/or Traffic Policy Selector Unit 147 may be implemented as part of Enforcer Unit 111, or as a unit that is operably associated with Enforcer Unit 111, or as part of Predictor Unit 120, or as a unit that is operably associated with Predictor Unit 120, or as other suitable component of system 100.

Additionally, a Notification Generator Unit 145, which may be part of Predictor Unit 120 or may be operably associated with it, or which may be part of Policy Enforcer Unit 111 or may be operably associated with it, or may be implemented elsewhere in system 100, may generate a notification message or signal, and may deliver or send or transmit it to one or more pre-defined recipients and/or to one or more dynamically-selected recipients; for example, to an administrator or operator of system 100 or of Predictor Unit 120 or of Policy Enforcer Unit 111, to an administrator or operator of ISP/CSP network 110, to an administrator or operator of a fraud detection/fraud mitigation/fraud investigation department, or the like. In some embodiments, the recipient's identity may be dynamically determined; for example, it may be or may include an email address of a contact person or an owner of a domain name that is associated with an outgoing traffic-portion or with an incoming traffic-portion, or with a payload or a source or a destination of a particular set of packets. In some embodiments, the notification may optionally include a triggering signal or a triggering message, which may cause a remote server or a remote enforcement unit to perform one or more pre-defined operations (e.g., traffic blocking, traffic discarding, traffic quarantining, traffic steering, traffic re-routing, traffic delaying, or the like).

In some embodiments, a mitigation unit, such as an Attack/Fraud Mitigation Unit 146, may be triggered or activated by Predictor Unit 120, or by the Notification Generator 145; and may select and enforce (or deploy, or activate, or launch) one or more attack mitigation operations and/or fraud mitigation operations, which may be selected from a Bank of Mitigation Operations 149 which describes or defines such operations and/or rules for their activation or enforcement. The mitigation operations may include one or more of the operations described above; and/or other suitable operations, for example, adding a "fraud" label or tag or a "malicious activity" label or tag to a particular account or subscriber or device or source or destination or payload; adding a source address and/or a destination address and/or a sender and/or a receiver to a blacklist, and/or removing it from a whitelist (if it had appeared in such whitelist); enforcing a blacklist and/or a whitelist of senders and/or recipients and/or payloads, which should not be transported (blacklist) or which should be transported (whitelist); performing one or more monetary operations as a result of the mitigation operations; putting a freeze or a hold on an account; and/or other suitable operations.

Returning now again to the operation of Predictor Unit 120, this unit receives the data from the Data Collector and Mediator Unit 112. The data may be receives as raw data; or as partially-processed data; or as data that is gathered or grouped into dataset(s) or data-clusters or data troves, for example, each dataset corresponding to a particular communication flow, or corresponding to a particular time-slot of communications, or to a particular recipient, or to a particular sender, or to particular payload (e.g., set of packets that are transported from a particular sender to a particular recipient), or to a type of payload, or to a type of recipients, or to a type of senders; or other dataset(s) which may be grouped based on one or more other parameters or traffic-related characteristics and/or sender-related characteristics and/or recipient-related characteristics and/or payload-related characteristics and/or other relevant characteristics (e.g., time-of-day; allocated time-slot or time-interval; day-of-week; calendar date; size of payload; size of packets; number or frequency of packets sent by a particular sender; number or frequency of packets that are destined to a particular recipient; or the like). The raw data and/or the grouped data (as datasets) may be received from Data Collector and Mediator Unit 112, and/or may be grouped or re-grouped by Predictor Unit 120 into other dataset(s) based on one or more grouping criteria or rules or parameters.

In some embodiments, Data Collector and Mediator Unit 112 aggregates traffic data that is observed or that is monitored for a time interval of T seconds; for example, T=1 second (or 2 seconds, or 5 seconds); and generates raw datasets, each dataset corresponding to the traffic of that time-interval of T seconds; and supplies those datasets to Predictor Unit 120 (and also to the Re-Training Unit 130) for further processing.

Figure 2:
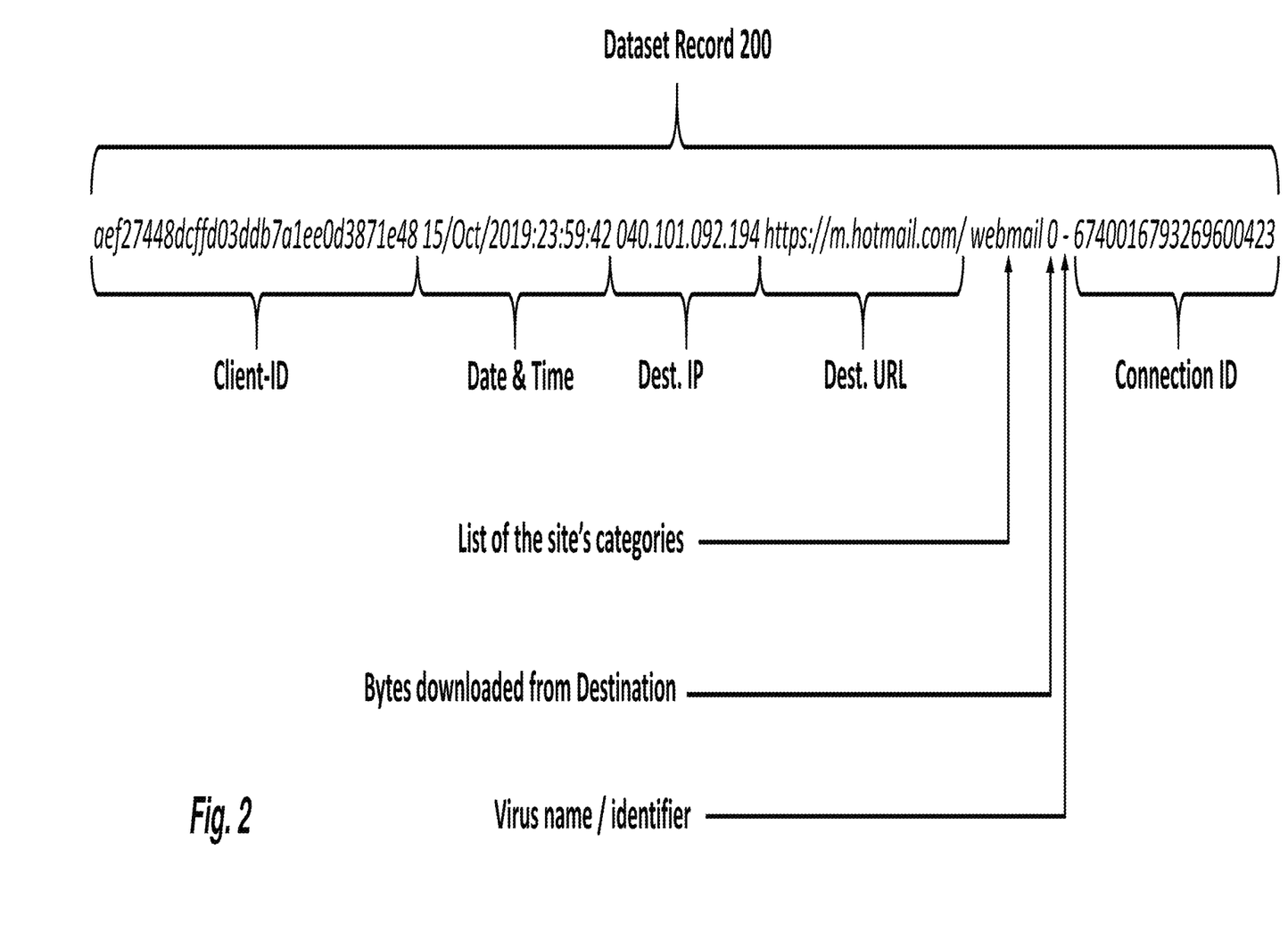
FIG. 2 is a schematic illustration of a dataset record, which may be constructed and utilized in accordance with some demonstrative embodiments.

Reference is made to FIG. 2, which is a schematic illustration of a dataset record 200, as constructed by the Data Collector and Mediator Unit 112 and as provided to the Predictor Unit 120 and to the Re-Training Unit 130, in accordance with some demonstrative embodiments. For example, dataset record 200 may include the following fields: (a) Client-ID, indicating an identifier of the Internet-connected device that is associated with this traffic; (b) date-stamp and time-stamp; (c) Internet Protocol (IP) address of the destination; (d) the URL that was accessed or navigated to, or the destination's URL; (e) one or more categories to which the site (or domain) belong (e.g., it is a Webmail service; it is a Social Network; it is a Streaming Video website; it is a News website); (f) the number of bytes that were downloaded from the visited server or the destination's server; (g) name or identifier of a virus or a malware (if it is detected; or a pre-defined indicator, such as "-", if it is not detected); (h) Connection ID, indicating an identifier of the connection.

Referring again to FIG. 1, in some embodiments, Predictor Unit 120 is implemented by (or may comprise) a Machine Learning (ML)/Deep Learning (DL) unit 141, able to generate ML/DL based insights or estimations, or determinations (e.g., if an estimated output is associated with a numeric certainty level that is greater than a pre-defined threshold level of certainty). For example, a Dataset(s) Generator 143 may receive the raw data or other data from the Data Collector and Mediator Unit 112, during a particular time-window or time-interval (denoted T); and may organize the data into dataset(s), or into group(s) of data-items; which are fed into the ML/DL Unit 141. A Features Extractor 142 operates to extract one or more features from the dataset(s), for ML/DL analysis. For example, the time-window T may be 10 seconds, or 20 seconds, or 30 seconds, or 40 seconds, or 60 seconds, or 90 seconds, or other time-window which may be manually configured by a system administrator, and/or which may be dynamically set or dynamically re-configured or dynamically modified by the Dataset(s) Generator 143 itself, for example, based on the volume of traffic data that is pending for analysis (e.g., dynamically setting a time-window of T seconds, which corresponds to an average traffic volume of N packets or to N payload-items; wherein N is a pre-defined value or a configurable value). The extracted features are used by the ML/DL unit 141 to generate the estimations or determinations or insights. Optionally, a Classification Unit 144 operates to classify packets or payload-items or payload-units, or other types of analyzed data or monitored data, into a class or a cluster or a type, or to classify such item(s) as belonging to a particular class or type (e.g., a type of "estimated to be associated with fraudulent or malicious activity", or a type of "estimated not to be associated with fraudulent or malicious activity").

Predictor Unit 120 may include, and may utilize, one or more other components whose operations are further discussed herein; for example, a Clustering Unit 152 configured to create or detect or construct clusters of data-items or data-points (e.g., that are classified as Anomalous; or, that are classified as Non-Anomalous); a Data Encoding and Dimensions Reduction Unit 151, configured to perform data encoding and/or dimensions reduction with regard to datasets and/or features; a Recurrent Neural Network (RNN) Unit 153; a Natural Language Processing (NLP) Unit 154; and/or other suitable units or components.

Optionally, a Model Re-Training Unit 130 operates to utilize the latest collected data (e.g., collected in the past M minutes or in the past H hours) to re-train the ML/DL model(s) used by the ML/DL Unit 141 of Predictor Unit 120. The re-training is performed periodically; for example, every 12 or 18 or 24 or 36 or 48 hours, and/or at time-intervals that correspond to a volume of analyzed traffic (e.g., corresponding to a pre-defined number N of analyzed packets or payload-items; such as, every 500,000 packets). The Model Re-Training Unit 130 uses its own Anomaly Detector 131 (e.g., similar to Anomaly Detector 121) and its own Behavior Analysis Unit 132 (e.g., similar to Behavior Analysis Unit 122), in order to generate or construct an updated model. The updated model(s), or in some situations a replacement model, is then provided by the Model Re-Training Unit 130 to the ML/DL Unit 141 of Predictor Unit 120, to enable dynamic updating of the operational functionality of the ML/DL Unit 141 of Predictor Unit 120.

Some embodiments may thus detect fraudulent and/or malicious activity on (or of, or with regard to, or associated with) particular Internet-connected devices/users/accounts; by using the ML/DL unit (or other suitable AI engine) to detect traffic anomalies and/or behavioral anomalies using non-labeled multi-variate time series. Since the method uses non-labeled data, and/or in order to resolve problems of unsupervised learning, the method may include auto-encoding of raw datasets. The anomaly detection may operate based on a rule that a majority of user traffic is "normal" (e.g., legitimate, non-fraudulent, non-malicious), and those outliers or patterns that are away from the "normal" data clusters are indicators of a malicious/fraudulent anomaly. Having a temporal series of behaviors, the method may use a Recurrent Neural Network (RNN) to predict the expected behavior and compare it with the actual behavior in order to detect variations or anomalies in the behavior. As described, anomalies indicate a threat or a risk, and are then used for triggering traffic-related policy enforcement, as well as activation of fraud mitigation operations and/or malicious activity mitigation operations. The used models are dynamically updated and adapted to the changing environment (e.g., new behavior due to new interests of users; new traffic patterns due to introduction of new applications) by continuously or periodically re-training the models.

Figure 3:
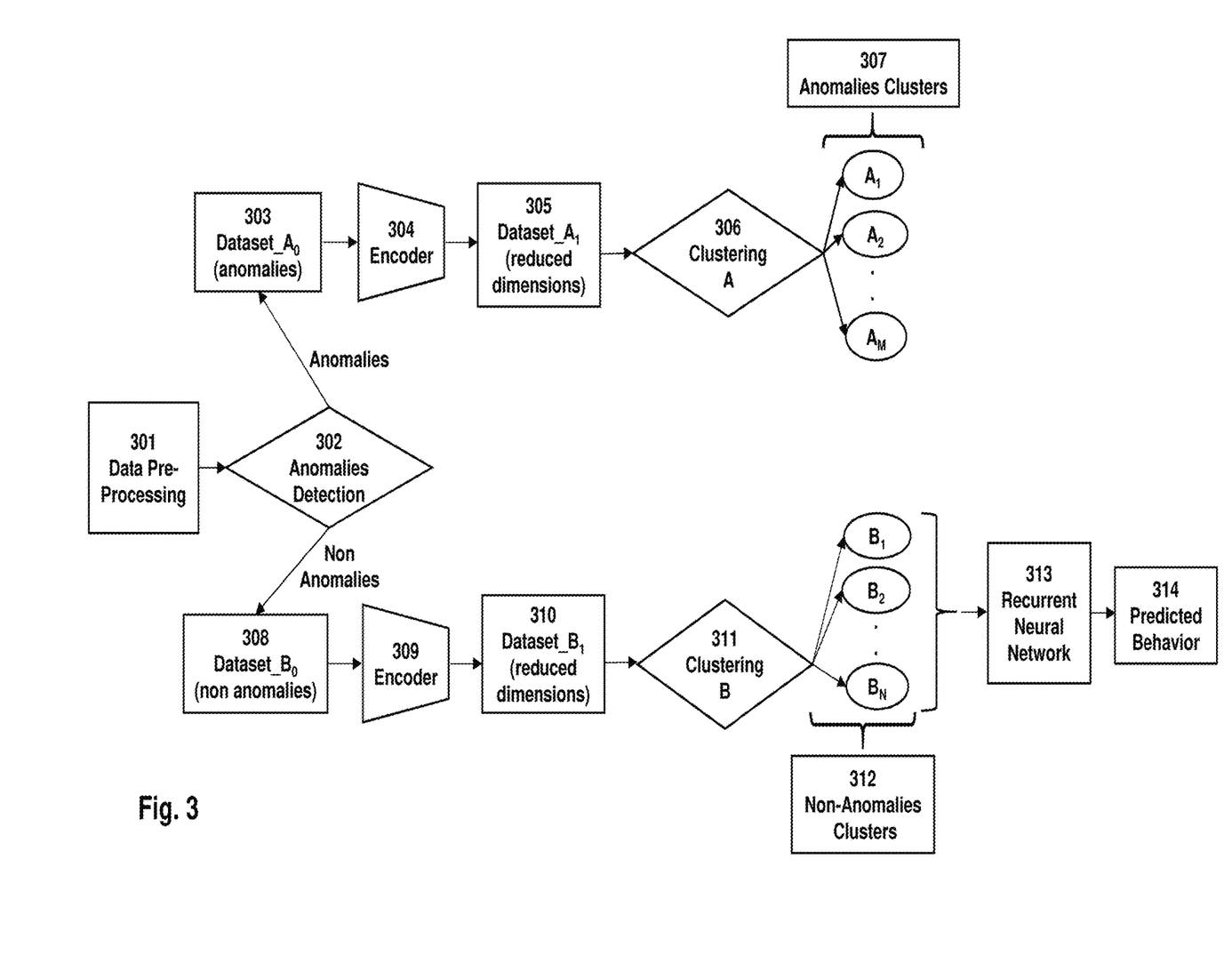
FIG. 3 is a schematic illustration demonstrating a flow of operation of a Predictor Unit, in accordance with some embodiments.

Reference is made to FIG. 3, which is a schematic illustration demonstrating a flow of operation of the Predictor Unit, in accordance with some embodiments. The predictor unit analyzes dataset records, ang generates predictions or estimations with regard to traffic anomalies and with regard to abnormal/normal behaviors of end-user devices.

As indicated in block 301, data pre-processing is performed. For example, datasets generated by the Data Collector and Mediator are passed through the Anomaly Detector which performs anomalies detection, to classify every window of traffic as either (I) "anomalous traffic" (or "abnormal traffic", or "irregular traffic"), or (II) "non-anomalous traffic" (or "normal traffic" or "non-abnormal traffic" or "regular traffic" or "non-irregular traffic"). For example, raw datasets are grouped or aggregated, for each particular user and for time-windows or time-interval of T1 seconds (e.g., T1 being 10 or 15 or 20 or 30 seconds, or other pre-defined value). The output of this block may include, for example, an 8×T1 time series, where 8 is the number of metrics calculated per one second.

In some embodiments, such metrics may include some or all of the following: (a) the day of the week (e.g., in a scale of 1 to 7); (b) the second of the day (e.g., in the range of 1 to 86,400); (c) the number of requests (e.g., HTTP requests, or HTTPS requests, or both HTTP and HTTPS requests) that were made within that particular second; (d) the number of bytes that were downloaded during that particular second; (e) the navigation time (e.g., the web browsing time; or the time-length that the device spends accessing a particular website or web-page or URL; or the time-length between requesting access to a website and then requesting access to another website, by the same end-user device); (f) list of threesome items or triple items, wherein each triple item includes, or is formatted as, (f1) Category index number (e.g., corresponding to News, or Games, or Social Network, or Streaming Video, or the like), and (f2) Content Type index number (e.g., corresponding to HTML content, or application content, or the like), and (f3) the number of occurrences of this pair of Category index number and Content Type index number during this particular second.

In some embodiments, an anomaly is characterized by (or by taking into account) the amount and/or frequency of the requests made, and/or the categories of visited sites, and/or the distribution of requests along the time-windows (each time-window is of T1 seconds); and therefore, the additional three features may be extracted and analyzed, totaling 11 features (with the previous 8 features): (I) the number of requests made; (II) the top N categories (e.g., the top 3 or the top 5 categories of sites visited that were visited or accessed during the time-window (e.g., News, Social Networks, Gaming, Streaming Videos, Search Engines, Electronic Commerce websites; (III) the number of visits, that belong to those N top categories, that are known to be visits to destinations that are associated with fraudulent or malicious activity (e.g., malware sites, domains associated with malware, phishing sites, domains associated with phishing, botnet sites, domains associated with a botnet, and possibly (in some embodiments) also anti-virus sites and/or non-categorized sites).

In some embodiments, additional features or group(s) of features may be extracted or monitored or analyzed, particularly for behavior analysis; for example: (a) Index of the window of traffic, which may then be used to match this window with its corresponding recurrent plot calculated in Anomalies Detection; (b) Day of the week; (c) Second of the day at which this window of traffic begins; (d) the number of requests generated in that time-window; (e) the variation in the number of requests with respect to the immediately previous window of traffic, particularly in order to detect deviation between consecutive time-windows; (f) list of occurrences for every category (for example, to avoid getting a sparse vector of categories, some embodiments may define 120 possible categories that a site can be related to, which are then reduced to 20 categories using a transformation rule, such as CategoryIndex % 20); (g) the number of different domains (or, the number of different destination IP addresses) that were during the time-window; (h) the variation in the number of domains (or destination IP addresses) from the most-previous time-window to the current time-window, in order to detect variability between consecutive time-windows; (i) a list of the number of the occurrences of the N destination domains (or, destination IP addresses) that are the most-visited during the time-window. Other suitable features may be extracted, monitored and/or analyzed.

As indicated in block 302, an Anomaly Detection analysis is performed to analyze a time series of these 11 features (or other suitable features), applying a scheme of sliding windows with width of T2 seconds (for example, T2 may be 600 or 900 or 1,200 seconds, or other suitable value), and with a stride of T3 seconds (e.g., T2 may be 400 or 450 or 500 seconds), to capture or to detect temporal dependencies between consecutive time-windows. Since the features have been aggregated for time-intervals of T1 seconds, every window will contain T2/T1 datasets. Anomalous traffic is handled by blocks 303 to 307; whereas, Non-Anomalous traffic is handled by blocks 308 to 314.

Referring now to the Anomalous traffic: as indicated in block 303, a Dataset_A0 is constructed, containing features for the traffic windows that have been classified as Anomalous traffic.

As indicated in block 304, a Data Encoder and Dimensions Reduction Unit may perform data encoding and dimensions reduction of the anomalous traffic datasets; optionally utilizing an Adam algorithm for encoder training, or other suitable adaptive moment estimation algorithm.

As indicated in block 305, a Dataset_A1 is thus constructed, being a dimension-reduced dataset of anomalous traffic.

As indicated in block 306, a clustering process is performed (Clustering A), running on the Dataset_A1, in order to classify this dataset and construct a set of clusters for anomalous traffic; optionally utilizing a Hierarchical Navigable Small World (HNSW) algorithm or other suitable clustering method.

As indicated in block 307, anomalies clusters (for example, M such anomalies clusters) are generated, representing anomalies recognized in the traffic; for example: a cluster A1, representing traffic anomalies that are related to visiting websites (or domains) that are known to be associated with malware; a cluster A2, representing traffic anomalies that are related to visiting websites (or domains) that are known to be associated with phishing attacks; a cluster A3, representing traffic anomalies that are related to visiting websites (or domains) whose content is non-categorized or is unknown; and so forth, a cluster A4, representing traffic anomalies that are related to activity that involved a large number of HTTP requests and/or HTTPS requests; and so forth, with a total of M such clusters of anomalous traffic.

Referring now to the Non-Anomalous traffic per block 302: as indicated in block 308, a Dataset_B0 is constructed, containing features for the traffic windows that have been classified as Non-Anomalous traffic (or as "regular" or "normal" traffic).

As indicated in block 309, a Data Encoder and Dimensions Reduction Unit may perform data encoding and dimensions reduction of the non-anomalous traffic datasets; optionally utilizing an Adam algorithm for encoder training, or other suitable adaptive moment estimation algorithm.

As indicated in block 310, a Dataset_B1 is thus constructed, being a dimension-reduced dataset of non-anomalous traffic.

As indicated in block 311, a clustering process is performed (Clustering B), running on the Dataset_B1, in order to classify this dataset and to construct a set of clusters for non-anomalous traffic; optionally utilizing a Hierarchical Navigable Small World (HNSW) algorithm or other suitable clustering method.

As indicated in block 312, non-anomalous clusters (for example, N such non-anomalous clusters) are generated, representing behavior (e.g., human user behavior as exhibited through the browsing or navigation operations, and/or device behavior of the Internet-connected device as exhibited through its operations and network requests) that characterizes the majority of traffic that is associated with a particular type of destination or online venue. For example: a cluster B1, representing human user behavior and/or device behavior that are exhibited in conjunction with traffic that is associated with visiting or accessing Social Network websites or destinations; a cluster B2, representing human user behavior and/or device behavior that are exhibited in conjunction with traffic that is associated with visiting or accessing Gamin websites or destinations; a cluster B3, representing human user behavior and/or device behavior that are exhibited in conjunction with traffic that is associated with visiting or accessing News websites or destinations; a cluster B4, representing human user behavior and/or device behavior that are exhibited in conjunction with traffic that is associated with visiting or accessing Ecommerce websites or destinations; a cluster B5, representing human user behavior and/or device behavior that are exhibited in conjunction with traffic that is associated with visiting or accessing Search Engines; and so forth, with a total of N such clusters that are related to non-anomalous traffic.

As indicated in block 313, these clusters are fed into a Recurrent Neural Network (RNN), which predicting the next behavior that is expected to be observed. If the RNN-generated prediction matches the actual next behavior that is exhibited by the user/the device, then there is no behavioral variation; otherwise, behavioral variation is detected. The behaviors may be handled or processed, optionally, by utilizing a Natural Language Processing (NLP) unit; for example, the system considers the series of behaviors as a sequence of "words" that forms a language, and behaviors of anomalous traffic are regarded as banned words of the language; hence the RNN learn the language during the training; the training set includes exclusively only sequences of behaviors that are categorized as non-anomalous traffic, and does not include any anomalies ("banned words").

As indicated in block 314, a predicted behavior analysis/comparison unit compares the behavior as predicted by the RNN, with the next actual behavior that is exhibited, in order to verify whether the user's behavior or the device's behavior has deviated.

Returning now to FIG. 1, in accordance with some embodiments, once the system is deployed and running, the DL model is periodically re-trained and updated; for example, once per week, or once per month, or once per 60 days, or the like, using the latest traffic data. The Re-Training Unit 130 may include and/or may utilize an Auto-Encoder (or Autoencoder) Unit 130, such as, a Neural Network (NN) or a Convolutional Neural Networks (CNN) that is trained to learn efficient (e.g., reduced-dimension) representation of features.

For example, for every time series, the method implements a convolution to smoothen the data, and then generates a distances vector; which is then converted into a square matrix or a recurrent plot. In a demonstrative non-limiting example, the Auto-Encoder Unit 133 receives as input a time series vector of 60 elements; performs a convolution to smoothen the data, and generates a vector of 56 elements;

then generates a distances vector, and then a vector of 1,596 elements, which is transformed into a matrix of 56 by 56 elements or to a recurrent plot of 56 by 56.

The resulting matrix may be visualized as an image, or as having data corresponding to a visual image. For example, the data may be represented in (or converted to) a three-channel format, similar to Red Green Blue (RGB) values or channels of an image. In a demonstrative example, the 11 features that were described above, or some of them, may be converted into the following three channels: (a) a first channel being the Requests Channel, indicating the total number of requests; (b) a second channel being the Frequent Categories channel, formed by the N (for example, five) most visited categories of sites or destinations; (c) a third channel being the Suspicious Categories channel, formed by two models running simultaneously for the same feature set which includes: (c1) Model-1, representing malware, phishing, antivirus, botnet, no-category; (c2) Model-2, representing malware, phishing, antivirus, botnet. The result is calculated as a Boolean arithmetic function: [TRUE, FALSE]= B (Model-1, Model-2), wherein B is defined per specific use-case (for example, in some embodiments B is an AND Boolean operator; or, in other embodiments, B is an OR Boolean operator).

Figure 4A:
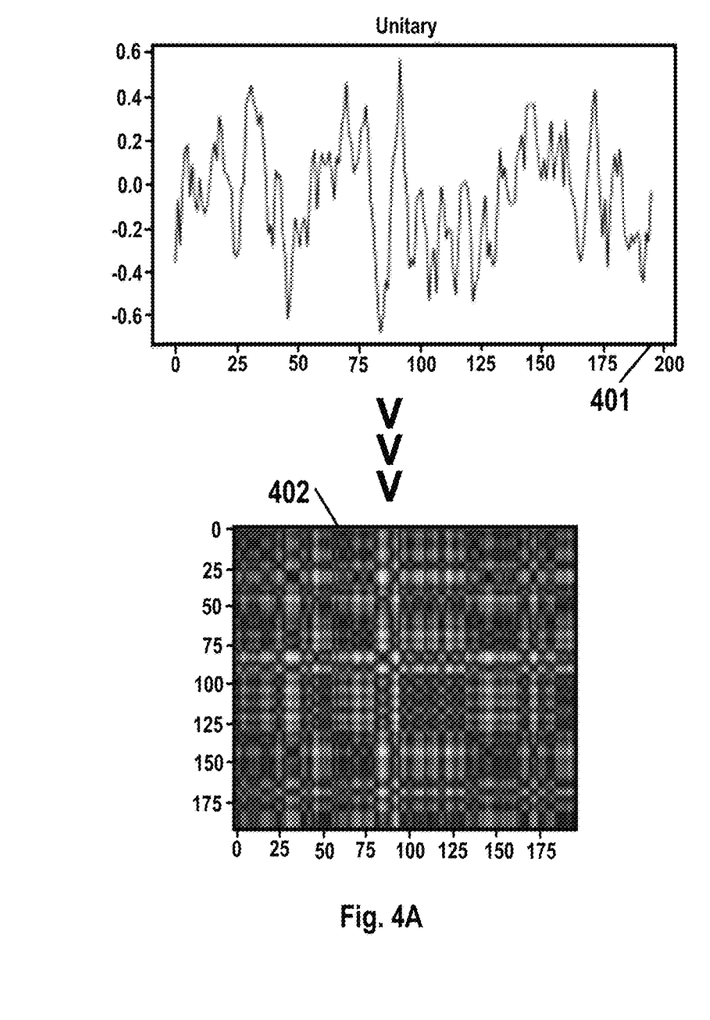
FIGS. 4A and 4B are schematic illustrations of visualizations of data representations and their transformation, in accordance with some demonstrative embodiments.
Figure 4B:
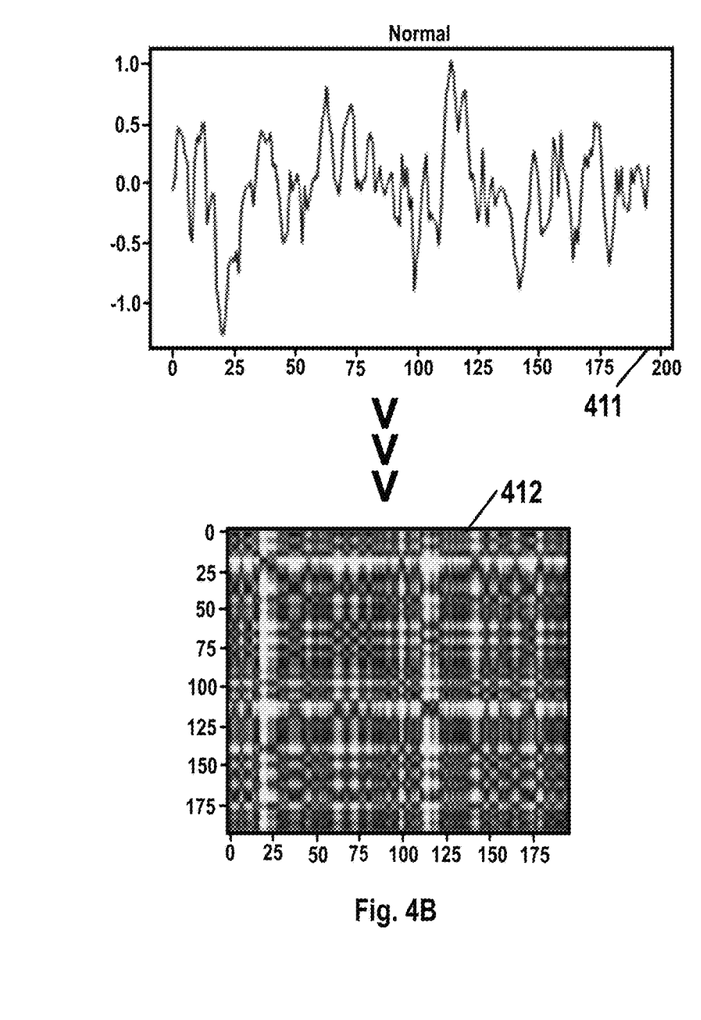

For demonstrative purposes, reference is made to FIGS. 4A and 4B, which are schematic illustrations of visualizations of data representations and their transformation, in accordance with some demonstrative embodiments. As shown in FIG. 4A, a set of initial data which is represented by a graph 401, is transformed into a two-dimensional matrix or image 402, showing particular patterns therein. Similarly, as shown in FIG. 4B, another set of initial data which is represented by a graph 411, is transformed into a two-dimensional matrix or image 412, showing particular patterns therein.

Turning now to the operation of the Auto-Encoder Unit, the images data, or the recurrent plots, are fed to the Auto-Encoder Unit; which is a Deep Learning (DL) unit that uses a DL model, implemented as a NN or CNN for which the input and output are expected to be as similar as possible. The Auto-Encoder Unit compresses or encodes the input data into a code with a dimension reduction; and then tries to reconstruct in the output, from that compressed code, the original input. Accordingly, the Auto-Encoder Unit 133 may include three parts: an encoder (or, a dimension-reducing encoder); a code having dimension reduction; and a decoder to decode that code (and, to check whether the decoded output is sufficiently similar to the fed input).

Figure 5:
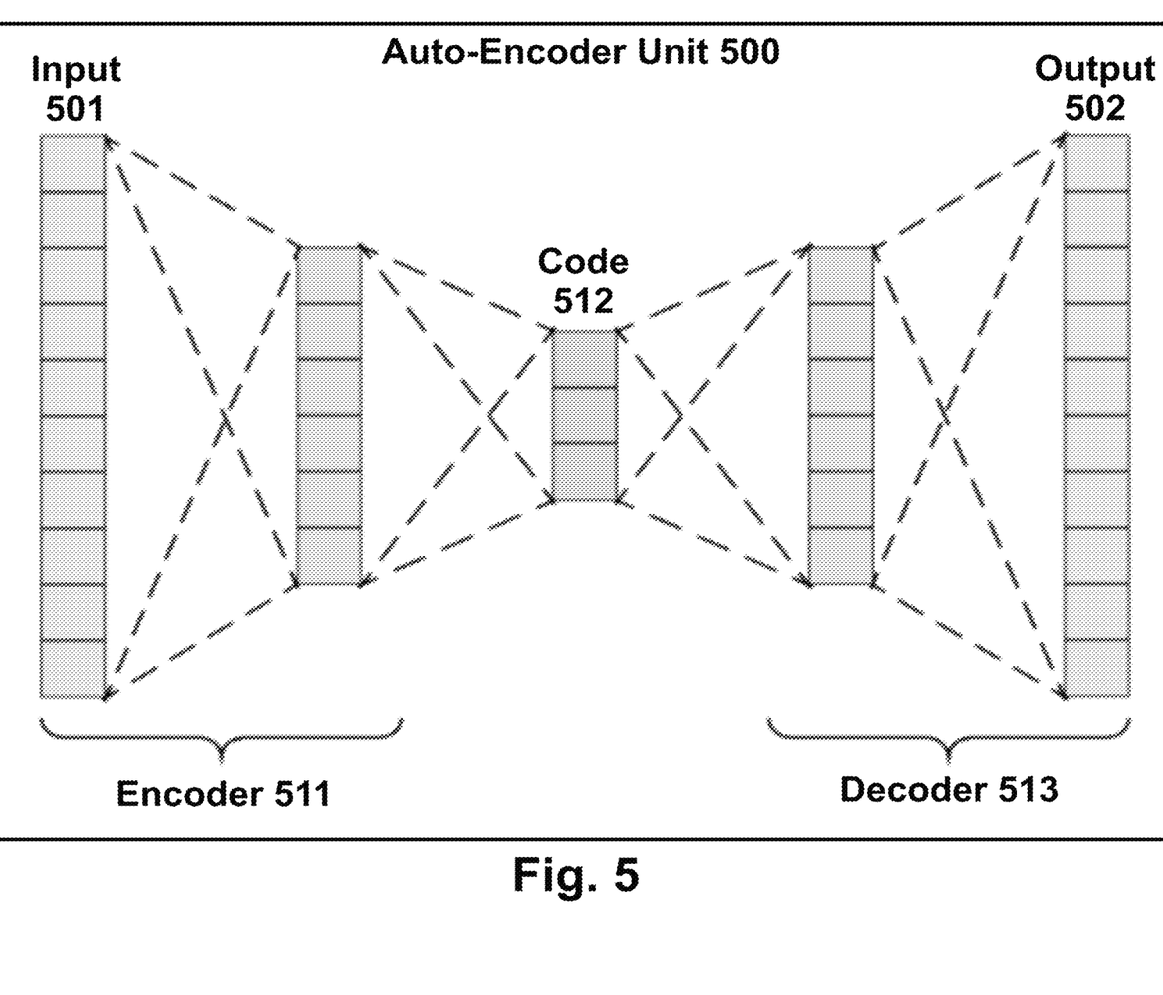
FIG. 5 is a schematic illustration demonstrating an Auto-Encoder Unit, in accordance with some demonstrative embodiments.

This is further demonstrated in FIG. 5, which is a schematic illustration demonstrating an Auto-Encoder Unit 500, in accordance with some demonstrative embodiments. For example, an Encoder 511 receives input data 501, and encodes it into a reduced-dimension(s) code 512. Then, a Decoder 513 decodes that code 512 to generate output data 502, which—if the encoding was efficient and accurate—should be identical or almost-identical to the input data 502, or sufficiently similar to the input data 502 (e.g., beyond a pre-defined threshold value of similarity).

In accordance with some embodiments, the Auto-Encoder Unit calculates an error between (i) the input data (the input image), and (ii) the output data (the output image that was decoded based on the reduced-dimension/latent-space representation). If such error is greater than or equal to a pre-defined threshold value, then the corresponding traffic window (having traffic of T2 seconds) is considered Anomalous traffic; otherwise, it is considered Non-Anomalous traffic (or "normal" or "regular" traffic).

In some embodiments, a system comprises: (a) a Data Collector and Mediator Unit, to monitor network traffic, and to generate datasets of network traffic; wherein each dataset includes network traffic that was monitored within a time-slot having a particular fixed time-length; (b) a Predictor Unit, comprising: a Features Extractor unit, to extract a plurality of features from said datasets; a Machine Learning (ML) unit, to run said features through a ML model and to classify a particular traffic-portion as being either (I) an anomalous traffic-portion that is associated with fraudulent or malicious activity, or (II) a non-anomalous traffic-portion that is not-associated with fraudulent or malicious activity; wherein the ML unit operates on both (i) anomalies in traffic patterns, and (ii) anomalies of user behavior or device behavior; (c) a fraud and malicious activity mitigation unit, configured to trigger activation of one or more pre-defined mitigation operations with regard to traffic-portions that were classified by the ML unit as being an anomalous traffic-portions that are associated with fraudulent or malicious activity.

In some embodiments, the ML unit performs classification of said particular traffic-portion as anomalous or as non-anomalous, using ML analysis of a non-labeled multivariate time series.

In some embodiments, rein the ML unit is configured to perform: a first ML-based analysis for anomaly detection in patterns of network traffic that was monitored within a particular time-slot, and also, a second, parallel, ML-based analysis for anomaly detection in Internet browsing or Internet navigation patterns that are exhibited by users or devices within said particular time-slot.

In some embodiments, the system further comprises: a Recurrent Neural Network (RNN) unit, which is associated with said ML unit, and which is configured to detect a variation that is greater than a pre-defined variation-threshold, between (I) an RNN-generated prediction of expected behavior of said users or devices within a next time-slot, and (II) data of actual behavior of said users or devices within said next time-slot.

In some embodiments, the Predictor Unit is a hybrid unit which comprises: a Traffic Patterns anomaly detector unit, configured to run a first ML model through a first ML unit on a first plurality of extracted features that correspond to characteristics of said network traffic, and to detect an anomaly in a traffic pattern of a particular dataset of a particular time-slot; a Machine Behavior anomaly detector unit, configured to run a second ML model through a second ML unit on a second plurality of extracted features that correspond to characteristics of behavior of Internet-connected devices that are associated with the traffic of said particular dataset, and to detect an anomaly in machine behavior of said particular dataset of said particular time-slot.

In some embodiments, the Predictor Unit is a hybrid unit which comprises: a Traffic Patterns anomaly detector unit, configured to run a first ML model through a first ML unit on a first plurality of extracted features that correspond to characteristics of said network traffic, and to detect an anomaly in a traffic pattern of a particular dataset of a particular time-slot; a User Behavior anomaly detector unit, configured to run a second ML model through a second ML unit on a second plurality of extracted features that correspond to characteristics of Internet navigation patterns of users who utilized Internet-connected devices during said particular time-slot, and to detect an anomaly in Internet navigation patterns of said particular dataset of said particular time-slot.

In some embodiments, the ML unit performs classification of said particular traffic-portion as anomalous or as non-anomalous, using ML analysis that is based at least on the following extracted features, for a particular time-slot: (I) Internet Protocol (IP) address of destinations that were accessed during said particular time-slot, and (II) URLs of destinations that were accessed during said particular time-slot, and (III) a total number of bytes that were downloaded during said particular time-slot.

In some embodiments, wherein each destination that was accessed during said particular time-slot, is classified as belonging to one or more website categories out of a pre-defined list of website categories; wherein the ML unit performs said classification using ML analysis that is further based on: the N most-frequent categories that were accessed during said particular time-slot, wherein N is a pre-defined integer.

In some embodiments, the system comprising: a Datasets Generator Unit, to group together monitored network traffic into datasets, wherein each dataset corresponds to a particular time-slot and to a particular Internet-connected device; wherein the Predictor Unit is configured to detect anomalous traffic based on ML analysis that takes into account at least the following extracted features: (I) a number of requests made within said particular time-slot to access Internet destinations; (II) the N most-visited categories of websites that were accessed during said particular time-slot, wherein N is a pre-defined integer; (III) a number of visits that occurred within said particular time-slot to websites that are known to be associated with fraudulent or malicious activities.

In some embodiments, the ML unit performs classification of said particular traffic-portion as anomalous or as non-anomalous, using ML analysis that is based at least on the following extracted features, for a particular time-slot: a variation between (I) a number of requests made within said particular time-slot to access Internet destinations, and (II) a number of requests made within an immediately-preceding time-slot to access Internet destinations.

In some embodiments, the ML unit performs classification of said particular traffic-portion as anomalous or as non-anomalous, using ML analysis that is based at least on the following extracted features, for a particular time-slot: a variation between (I) a number of IP addresses that were accessed within said particular time-slot, and (II) a number of IP addressed that were accessed within an immediately-preceding time-slot.

In some embodiments, the system further comprises: a clustering unit, to cluster together datasets of monitored network traffic into a plurality of discrete dataset-clusters; wherein each dataset-cluster comprises datasets of monitored traffic that were detected to correspond to one particular type of traffic anomaly.

In some embodiments, the system further comprises: a clustering unit, to cluster together datasets of monitored network traffic into a plurality of discrete dataset-clusters; wherein each dataset-cluster comprises datasets of monitored traffic that were detected to correspond to one particular type of behavioral anomaly.

In some embodiments, the system further comprises: a Recurrent Neural Network (RNN) unit, to receive as input said dataset-cluster, and to construct an RNN-generated prediction of expected behavior of said users or devices within a next time-slot; wherein said ML unit detects anomalous behavior based on a variation of said expected behavior from actual behavior that is observed within a next time-slot.

In some embodiments, the system further comprises: a Machine Learning Re-Training Unit, to periodically perform re-training of the ML model used by the ML unit; an Auto-Encoder Unit comprising a Convolution Neural Network (CNN), to apply a convolution to smoothen data of each time series, and to generate a distances vector, and to generate a square matrix corresponding to a recurrent plot image.

In some embodiments, the Auto-Encoder Unit generates said recurrent plot image by converting data into a three-channel format, that corresponds to Red Blue Green (RGB) image format.

In some embodiments, the three-channel format comprises: a first channel which is a Requests Channel, indicating a total number of Internet access requests performed within the particular time-slot; a second channel which is a Frequent Categories channel, indicating the N most visited categories of sites or destinations that were accessed during said particular time-slot, wherein N is a pre-defined integer; a third channel which is a Suspicious Categories channel, indicating whether an accessed Internet destination is (i) categorized as associated with fraudulent or malicious activity, or (ii) not categorized as associated or as unassociated with fraudulent or malicious activity.

In some embodiments, said one or more pre-defined mitigation operations comprise one or more of: traffic blocking, traffic discarding, traffic quarantining, traffic re-routing, traffic steering, traffic delaying, firewall re-configuring, traffic bandwidth limiting, packet modification, packet dropping, packet discarding, packet replacement, traffic-based charging operation.

In some embodiments, a method comprises: (a) monitoring network traffic, and generating datasets of network traffic; wherein each dataset includes network traffic that was monitored within a time-slot having a particular fixed time-length; (b) performing a Features Extraction process to extract a plurality of features from said datasets; in a Machine Learning (ML) unit, running said features through a ML model and classifying a particular traffic-portion as being either (I) an anomalous traffic-portion that is associated with fraudulent or malicious activity, or (II) a non-anomalous traffic-portion that is not-associated with fraudulent or malicious activity; wherein the ML unit operates on both (i) anomalies in traffic patterns, and (ii) anomalies of user behavior or device behavior; (c) triggering activation of one or more pre-defined fraud and malicious activity mitigation operations with regard to traffic-portions that were classified by the ML unit as being an anomalous traffic-portions that are associated with fraudulent or malicious activity; wherein the classifying of said particular traffic-portion as anomalous or as non-anomalous is performed using ML analysis of a non-labeled multivariate time series; wherein the method is implemented by utilizing at least a hardware processor.

Some embodiments comprise a non-transitory storage medium having stored thereon instructions that, when executed by one or more hardware processors, cause the one or more hardware processors to perform a method as described above.

In accordance with some embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments, may be combined with, or may be utilized in combination with, one or more other functions, operations, components and/or features described herein with reference to one or more other embodiments. Some embodiments may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
   (a) a Data Collector and Mediator Unit, to monitor network traffic, and to generate datasets of network traffic; wherein each dataset includes network traffic that was monitored within a time-slot having a particular fixed time-length;
   (b) a Predictor Unit, comprising:
       a Features Extractor unit, to extract a plurality of features from said datasets;
       a Machine Learning (ML) unit, to run said features through a ML model and to classify a particular traffic-portion as being either (I) an anomalous traffic-portion that is associated with fraudulent or malicious activity, or (II) a non-anomalous traffic-portion that is not-associated with fraudulent or malicious activity;
       wherein the ML unit operates on both (i) anomalies in traffic patterns, and (ii) anomalies of user behavior or device behavior;
   (c) a fraud and malicious activity mitigation unit, configured to trigger activation of one or more pre-defined mitigation operations with regard to traffic-portions that were classified by the ML unit as being an anomalous traffic-portions that are associated with fraudulent or malicious activity;
   (d) a Machine Learning Re-Training Unit, configured to periodically perform re-training of the ML model used by the ML unit;
   (e) an Auto-Encoder Unit comprising a Convolution Neural Network (CNN), configured to apply a convolution to smoothen data of each time series, and to generate a distances vector, and to generate a square matrix corresponding to a recurrent plot image;
       wherein the Auto-Encoder Unit is configured to generate said recurrent plot image by converting data into a three-channel format, that corresponds to Red Green Blue (RGB) image format;
       wherein the three-channel format comprises:
           (I) a first channel which is a Requests Channel, indicating a total number of Internet access requests performed within said time-slot;
           (II) a second channel which is a Frequent Categories channel, indicating the N most visited categories of sites or destinations that were accessed during said time-slot, wherein N is a pre-defined integer; and
           (III) a third channel which is a Suspicious Categories channel, indicating whether an accessed Internet destination is (i) categorized as associated with fraudulent or malicious activity, or (ii) not categorized as associated or as unassociated with fraudulent or malicious activity.

2. The system of claim 1,
wherein the ML unit performs classification of said particular traffic-portion as anomalous or as non-anomalous, using ML analysis of a non-labeled multivariate time series.

3. The system of claim 2,
wherein the ML unit is configured to perform
a first ML-based analysis for anomaly detection in patterns of network traffic that was monitored within a particular time-slot,
and also,
a second, parallel, ML-based analysis for anomaly detection in Internet browsing or Internet navigation patterns that are exhibited by users or devices within said particular time-slot.

4. The system of claim 3, further comprising:
a Recurrent Neural Network (RNN) unit,
which is associated with said ML unit,
and which is configured to detect a variation that is greater than a pre-defined variation-threshold, between (I) an RNN-generated prediction of expected behavior of said users or devices within a next time-slot, and (II) data of actual behavior of said users or devices within said next time-slot.

5. The system of claim 1,
wherein the Predictor Unit is a hybrid unit which comprises:
a Traffic Patterns anomaly detector unit, configured to run a first ML model through a first ML unit on a first plurality of extracted features that correspond to characteristics of said network traffic, and to detect an anomaly in a traffic pattern of a particular dataset of a particular time-slot;
a Machine Behavior anomaly detector unit, configured to run a second ML model through a second ML unit on a second plurality of extracted features that correspond to characteristics of behavior of Internet-connected devices that are associated with the traffic of said particular dataset, and to detect an anomaly in machine behavior of said particular dataset of said particular time-slot.

6. The system of claim 1,
wherein the Predictor Unit is a hybrid unit which comprises:
a Traffic Patterns anomaly detector unit, configured to run a first ML model through a first ML unit on a first plurality of extracted features that correspond to characteristics of said network traffic, and to detect an anomaly in a traffic pattern of a particular dataset of a particular time-slot;
a User Behavior anomaly detector unit, configured to run a second ML model through a second ML unit on a second plurality of extracted features that correspond to characteristics of Internet navigation patterns of users who utilized Internet-connected devices during said particular time-slot, and to detect an anomaly in Internet navigation patterns of said particular dataset of said particular time-slot.

7. The system of claim 1,
wherein the ML unit performs classification of said particular traffic-portion as anomalous or as non-anomalous, using ML analysis that is based at least on the following extracted features, for a particular time-slot:
(I) Internet Protocol (IP) address of destinations that were accessed during said particular time-slot, and
(II) URLs of destinations that were accessed during said particular time-slot, and
(III) a total number of bytes that were downloaded during said particular time-slot.

8. The system of claim 7,
wherein each destination that was accessed during said particular time-slot, is classified as belonging to one or more website categories out of a pre-defined list of website categories;
wherein the ML unit performs said classification using ML analysis that is further based on: the M most-frequent categories that were accessed during said particular time-slot, wherein M is a pre-defined integer.

9. The system of claim 1, comprising:
a Datasets Generator Unit, to group together monitored network traffic into datasets,
wherein each dataset corresponds to a particular time-slot and to a particular Internet-connected device;
wherein the Predictor Unit is configured to detect anomalous traffic based on ML analysis that takes into account at least the following extracted features:
(I) a number of requests made within said particular time-slot to access Internet destinations;
(II) the P most-visited categories of websites that were accessed during said particular time-slot, wherein P is a pre-defined integer;
(III) a number of visits that occurred within said particular time-slot to websites that are known to be associated with fraudulent or malicious activities.

10. The system of claim 1,
wherein the ML unit performs classification of said particular traffic-portion as anomalous or as non-anomalous, using ML analysis that is based at least on the following extracted features, for a particular time-slot:
a variation between (I) a number of requests made within said particular time-slot to access Internet destinations, and (II) a number of requests made within an immediately-preceding time-slot to access Internet destinations.

11. The system of claim 1,
wherein the ML unit performs classification of said particular traffic-portion as anomalous or as non-anomalous, using ML analysis that is based at least on the following extracted features, for a particular time-slot:
a variation between (I) a number of IP addresses that were accessed within said particular time-slot, and (II) a number of IP addresses that were accessed within an immediately-preceding time-slot.

12. The system of claim 1, further comprising:
a clustering unit, to cluster together datasets of monitored network traffic into a plurality of discrete dataset-clusters,
wherein each dataset-cluster comprises datasets of monitored traffic that were detected to correspond to one particular type of traffic anomaly.

13. The system of claim 1, further comprising:
a clustering unit, to cluster together datasets of monitored network traffic into a plurality of discrete dataset-clusters,
wherein each dataset-cluster comprises datasets of monitored traffic that were detected to correspond to one particular type of behavioral anomaly.

14. The system of claim 13, further comprising:
a Recurrent Neural Network (RNN) unit, to receive as input said dataset-cluster, and to construct an RNN-generated prediction of expected behavior of said users or devices within a next time-slot;
wherein said ML unit detects anomalous behavior based on a variation of said expected behavior from actual behavior that is observed within a next time-slot.

15. The system of claim 1,
wherein said one or more pre-defined mitigation operations comprise one or more of:
traffic blocking, traffic discarding, traffic quarantining, traffic re-routing, traffic steering, traffic delaying, firewall re-configuring, traffic bandwidth limiting, packet modification, packet dropping, packet discarding, packet replacement, traffic-based charging operation.

16. A method comprising:
(a) monitoring network traffic, and generating datasets of network traffic; wherein each dataset includes network traffic that was monitored within a time-slot having a particular fixed time-length;
(b) performing a Features Extraction process to extract a plurality of features from said datasets;
in a Machine Learning (ML) unit, running said features through a ML model and classifying a particular traffic-portion as being either (I) an anomalous traffic-portion that is associated with fraudulent or malicious activity, or (II) a non-anomalous traffic-portion that is not-associated with fraudulent or malicious activity;
wherein the ML unit operates on both (i) anomalies in traffic patterns, and (ii) anomalies of user behavior or device behavior;
(c) triggering activation of one or more pre-defined fraud and malicious activity mitigation operations with regard to traffic-portions that were classified by the ML unit as being an anomalous traffic-portions that are associated with fraudulent or malicious activity;
(d) in a Machine Learning Re-Training Unit, periodically performing re-training of the ML model used by the ML unit;
(e) in an Auto-Encoder Unit that comprises a Convolution Neural Network (CNN), applying a convolution to smoothen data of each time series, and to generate a distances vector, and to generate a square matrix corresponding to a recurrent plot image;

at the Auto-Encoder Unit, generating said recurrent plot image by converting data into a three-channel format, that corresponds to Red Green Blue (RGB) image format;

wherein the three-channel format comprises:
- (I) a first channel which is a Requests Channel, indicating a total number of Internet access requests performed within said time-slot;
- (II) a second channel which is a Frequent Categories channel, indicating the N most visited categories of sites or destinations that were accessed during said time-slot, wherein N is a pre-defined integer; and
- (III) a third channel which is a Suspicious Categories channel, indicating whether an accessed Internet destination is (i) categorized as associated with fraudulent or malicious activity, or (ii) not categorized as associated or as unassociated with fraudulent or malicious activity;

wherein the method is implemented by utilizing at least a hardware processor.

17. A non-transitory storage medium having stored thereon instructions that, when executed by a processor, cause the processor to perform a method comprising:
- (a) monitoring network traffic, and generating datasets of network traffic; wherein each dataset includes network traffic that was monitored within a time-slot having a particular fixed time-length;
- (b) performing a Features Extraction process to extract a plurality of features from said datasets;
  in a Machine Learning (ML) unit, running said features through a ML model and classifying a particular traffic-portion as being either (I) an anomalous traffic-portion that is associated with fraudulent or malicious activity, or (II) a non-anomalous traffic-portion that is not-associated with fraudulent or malicious activity; wherein the ML unit operates on both (i) anomalies in traffic patterns, and (ii) anomalies of user behavior or device behavior;
- (c) triggering activation of one or more pre-defined fraud and malicious activity mitigation operations with regard to traffic-portions that were classified by the ML unit as being an anomalous traffic-portions that are associated with fraudulent or malicious activity;
- (d) in a Machine Learning Re-Training Unit, periodically performing re-training of the ML model used by the ML unit;
- (e) in an Auto-Encoder Unit that comprises a Convolution Neural Network (CNN), applying a convolution to smoothen data of each time series, and to generate a distances vector, and to generate a square matrix corresponding to a recurrent plot image;
  at the Auto-Encoder Unit, generating said recurrent plot image by converting data into a three-channel format, that corresponds to Red Green Blue (RGB) image format;

wherein the three-channel format comprises:
- (I) a first channel which is a Requests Channel, indicating a total number of Internet access requests performed within said time-slot;
- (II) a second channel which is a Frequent Categories channel, indicating the N most visited categories of sites or destinations that were accessed during said time-slot, wherein N is a pre-defined integer; and
- (III) a third channel which is a Suspicious Categories channel, indicating whether an accessed Internet destination is (i) categorized as associated with fraudulent or malicious activity, or (ii) not categorized as associated or as unassociated with fraudulent or malicious activity.

* * * * *